United States Patent
Hon et al.

(10) Patent No.: US 8,266,214 B2
(45) Date of Patent: *Sep. 11, 2012

(54) SYSTEM AND METHOD FOR COLLABORATIVE WEB-BASED MULTIMEDIA LAYERED PLATFORM WITH RECORDING AND SELECTIVE PLAYBACK OF CONTENT

(75) Inventors: Henry Hon, Berkeley, CA (US);
Timothy Hon, Oakland, CA (US);
David Rorex, Walnut Creek, CA (US);
Michael Bautista, Emeryville, CA (US)

(73) Assignee: Simulat, Inc., Berkeley, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/660,001

(22) Filed: Feb. 17, 2010

(65) Prior Publication Data

US 2010/0185733 A1    Jul. 22, 2010

Related U.S. Application Data

(63) Continuation-in-part of application No. 11/657,787, filed on Jan. 24, 2007, now Pat. No. 7,933,956, and a continuation-in-part of application No. 12/378,805, filed on Feb. 20, 2009, and a continuation-in-part of application No. 12/319,807, filed on Jan. 13, 2009, now abandoned.

(60) Provisional application No. 60/761,529, filed on Jan. 24, 2006.

(51) Int. Cl.
*G06F 15/16* (2006.01)

(52) U.S. Cl. ...................................... 709/205; 709/246

(58) Field of Classification Search .................. 709/205, 709/204, 224, 231, 236, 246; 715/733–759
See application file for complete search history.

(56) References Cited

U.S. PATENT DOCUMENTS

| | | | |
|---|---|---|---|
| 7,296,023 B2* | 11/2007 | Geyer et al. | 1/1 |
| 7,698,660 B2* | 4/2010 | Sanchez et al. | 715/863 |
| 7,788,323 B2* | 8/2010 | Greenstein et al. | 709/204 |
| RE41,754 E * | 9/2010 | Knight | 715/751 |
| 7,853,886 B2* | 12/2010 | Drucker et al. | 715/759 |
| 7,945,622 B1* | 5/2011 | Pegg | 709/204 |
| 8,006,189 B2* | 8/2011 | Dachs | 715/751 |
| 2002/0129106 A1* | 9/2002 | Gutfreund | 709/205 |
| 2004/0181577 A1* | 9/2004 | Skurikhin et al. | 709/204 |
| 2008/0155104 A1* | 6/2008 | Quinn et al. | 709/227 |
| 2008/0183811 A1* | 7/2008 | Kotras et al. | 709/203 |
| 2009/0125566 A1* | 5/2009 | Kuo | 707/201 |

* cited by examiner

*Primary Examiner* — Wing Chan
*Assistant Examiner* — Ruolei Zong
(74) *Attorney, Agent, or Firm* — Joseph R. Calvalko, Jr.

(57) ABSTRACT

The present invention relates to a method and system for creating a collaborative file in a shared network including: accessing one or more user machines in a shared space, wherein the shared space is created by interaction of executable codes in a host and a user application and the shared space is described by a session attribute list; loading a media application with tools into one or more user machines; using a stage manager tool from the media application to stage and correlating media-layer events according to spatial, temporal and relational coordinate data in the user application, wherein the content composed of the media-layer events are described by at least a user, media-layer events, time and command; recording content associated with one or more of layers according to a user, media-layer events, time and command; and accessing said content based upon a user, media-layer events, time and command.

19 Claims, 13 Drawing Sheets

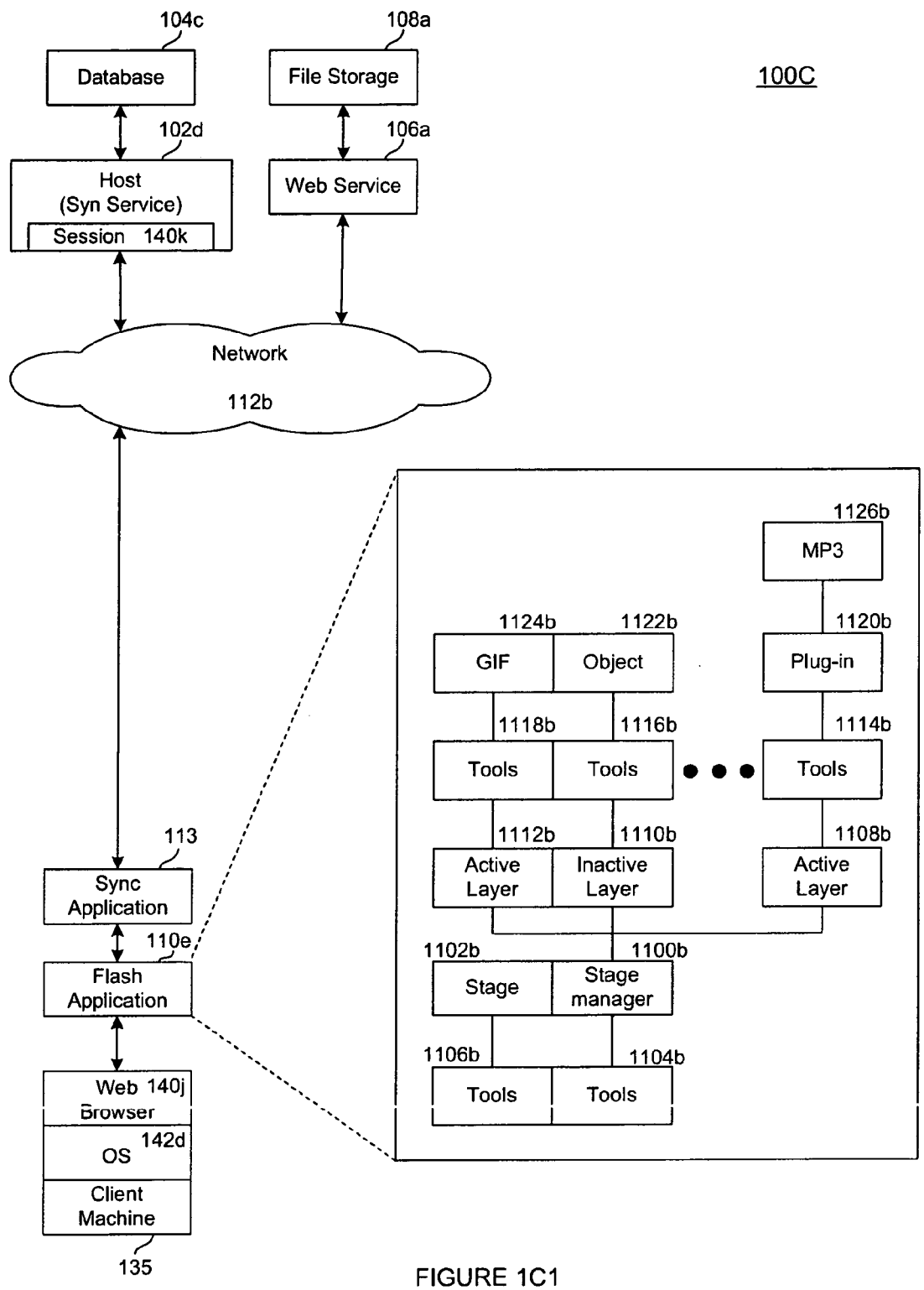
FIGURE 1C1

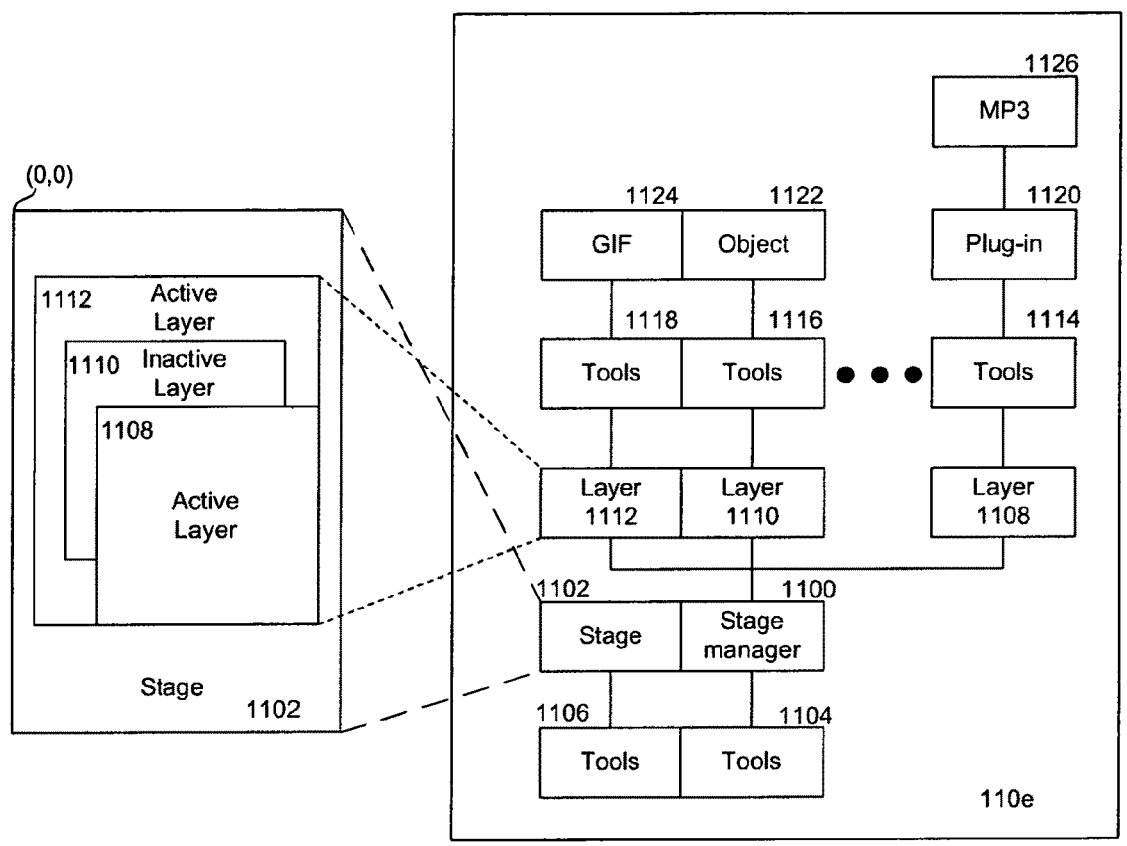
FIGURE 1C2

SYSTEM AND METHOD FOR COLLABORATIVE WEB-BASED MULTIMEDIA LAYERED PLATFORM WITH RECORDING AND SELECTIVE PLAYBACK OF CONTENT

This is a continuation-in-part U.S. patent application Ser. No. 11/657,787 of and claims the priority benefit under 35 U.S.C. 120 of U.S. Pat. No. 7,933,956 entitled A System and Method to Create a Collaborative Web-based Multimedia Layered Platform, filed Jan. 24, 2007; U.S. patent application Ser. No. 12/319,807 entitled System and Method to Create a Collaborative Web-based Multimedia Contextual Dialogue filed on Jan. 13, 2009 now abandoned; U.S. patent application Ser. No. 12/378,805 filed Feb. 20, 2009 entitled System and Method to Create a Collaborative Web-based Multimedia Contextual Document; and additionally claims the benefit under 35 U.S.C. 119 (e) of U.S. Provisional Application No. 60/761,529, entitled A System and Method to Create a Collaborative Web-Based Multimedia Layered Platform, filed on Jan. 24, 2006, each of the entire disclosures of which are hereby incorporated by reference herein.

FIELD OF THE INVENTION

This invention generally relates to the field of asynchronous and synchronous web document production methods and systems.

BACKGROUND OF THE INVENTION

In the last few years, there has been an explosion in new forms of web based communication within a shared space. The synchronous form is most commonly practiced as Online Chat. With synchronous communication, like Online Chat for example, text is exchanged in real-time between participants. Although images can be provided to a limited extent, links to images or other multimedia is more commonly used. Another common form of synchronous communication is with web conferencing services. These services provide a discrete state synchronicity such that only one image can be shared at one time. Typically, once the session has ended, the images shared are lost. Many of the current online collaboration systems are beginning to record the sessions. For example, recording in collaborative environment is presently done as a complete video stream. However, shortcoming with present collaborative systems is that when individuals are participants to group projects it is not possible to determine who contributes what content, nor is it possible to search the content based on contributor or user, event, time or command that created the content.

The most common asynchronous forms of collaboration are forums, blogs and WIKIs. In the asynchronous case, visitors can upload text or images so that all subsequent visitors can browse and see the text or images. Blogs and Forums have an advantage over Chat in that conversations can be linked into 'threads'. This allows the user to follow a set of contributions in a linear and/or nested fashion. Lacking is the real-time aspect as well as the ability to layer media. Currently even if you can upload an image or multimedia clip into a chat room or blog, it is not known for visitors to alter, manipulate or annotate over the original posting. What is common to these forms of shared communication is that they are linear. All information whether text or image, is accessed in order. A comment in a blog about an image does not appear on top of the image, but instead next to it as with 'threads'. The same holds true for a chat box. Users must cut and paste to refer to a past event.

Lacking is a system that will allow both synchronous and asynchronous communication using discrete media layers such that information can be organized by time and space which in turn can allow for a variety of organizational metaphors.

It will be desirable that multiple users are able to interact with one another and perform a plurality of multimedia tasks in a virtual and synchronized shared environment; or to be able to access and review the performed tasks from local or remote sources at will in any order. It will also be desirable to allow users to set control or restrict the viewing of media layers in the same shared environment through different filtering algorithms based upon user, events, time (hereinafter "UET") and commands. It is also desirable that an original image can seem to be altered or manipulated by overlaying various media-layers together.

The following terminologies used in the application are selectively defined by online dictionaries such as Wikipedia to help understanding:

Account Owner (creator)—The person who owns, creates or maintains or provided stewardship over a particular session and all options, rights relevant to that session.

Annotation—Extra information associated with a particular point in a document or other piece of information.

API—An application programming interface (API) is the interface that a computer system or application provides in order to allow requests for service to be made of it by other computer programs, and/or to allow data to be exchanged between them.

Blog—A blog is a website in which journal entries are posted on a regular basis and displayed in reverse chronological order. The term blog is a shortened form for web log. Authoring a blog, maintaining a blog or adding an article to an existing blog is called "blogging". Individual articles on a blog are called "blog posts," "posts" or "entries". A person who posts these entries is called a "blogger". A blog comprises hypertext, images, and links (to other WebPages and to video, audio and other files). Blogs use a conversational documentation style. Often blogs focus on a particular "area of interest", such as Washington, D.C.'s political goings-on. Some blogs discuss personal experiences.

Collection—One or more media-layers that have an organizational structure. Typically this is stored as an XML file.

Converter—Programs for converting audio files, video, animations or applets of varying degrees of interactivity and function, presentations, documents, spreadsheets among other files in the original data format to another format that allows information to be accessible through a browser using a media application.

Common Web Browser—A web browser is a software application, technically a type of HTTP client, that enables a user to display and interact with HTML documents hosted by web servers or held in a file system. Popular browsers available for personal computers include Microsoft Internet Explorer®, Mozilla Firefox®, Opera®, Netscape®, Apple Safar® and Konqueror®. A browser is the most commonly used kind of user agent. The largest networked collection of linked documents is known as the World Wide Web. It is assumed that all common web browser will have Macromedia Flash® installed or will support the installation and proper execution of Flash® applications.

Dynamic button—A clickable link that can jump the user to a different page in the same book, a different book, generate a new email in the user's local email application, or send the user to a web page in a new browser window.

Event—A set of codes that describe the modification of a media-layer.

Images—defined as photographs, drawings (vector and raster), diagrams, etc.

Media-layer (media layer) (layer)—A media-layer is defined as a container that supports the display and modification of media and plug-ins. Media-layers have meta information, or attributes, such as; author, time/date created, its parent media-container, a list of children media-containers, position within 3D space, stacking order relative to the parent media-layer, size, reference to media or a plug-in that is assigned to the media-layer, etc Media (multi)—Multimedia is the use of several different media to convey information (text, audio, graphics, animation, video, and interactivity).

Medium—defined as the singular of multimedia. For example, text, a media, is a singular example of multimedia.

Network—A computer network is two or more computers connected together using a telecommunication system for the purpose of conununicating and sharing resources. Examples include but are not limited to a WAN or LAN connection or an internet, intranet or extranet connection.

Online Chat—Online chat can refer to any kind of communication over the internet, but is primarily meant to refer to direct 1 on 1 chat or chat rooms, using tools such as instant messenger applications-computer programs, Internet Relay Chat, talkers and possibly MUDs, MUCKs, MUSHes and MOOes.

Plug-in—A plug-in is a computer program that can, or must, interact with another program to provide a certain, usually very specific, function. Typical examples are plug-in to display specific graphic formats (e.g., SVG if the browser doesn't support this format natively), to play multimedia files, to encrypt/decrypt email (e.g., PGP), or to filter based upon UET and commands images in graphic programs. The main program (a web browser or an email client, for example) provides a way for plug-in to register themselves with the program, and a protocol by which data is exchanged with plug-in. Plug-ins are slightly different from extensions, which modify or add to existing functionality. The main difference is that plug-in generally run within a sandbox, rely on the main program's user interface, and have a well-defined boundary to their possible set of actions.

Room—A Room is a common reference to a 'shared space'. A room contains default tools, rules and permissions that are set and controlled by the room administrator.

Space—A shared virtual reference point where multiple users can interact in real-time upon shared objects.

Space Creator—The User creates an account to which a 'space' is allocated where other individuals also using a browser can engage in the synchronized or unsynchronized viewing and annotating of images.

Stage—A reference coordinate system that informs where media should be displayed. The most typical stage is a two dimensional Cartesian coordinate system where 0,0 is position in the upper right of the display area.

Session State—The state of all objects, GUI tools and controls, and media-layers, at any given time.

Sidebar panel—a window within a browser such as Windows® desktop (Windows is a registered trademark of Microsoft Corporation). Sidebars often perform various tasks, such as displaying the time and date and showing the CPU usage.

Threads—Threads in a forum are either flat (posts are listed in chronological order) or threaded (each post is made in reply to a parent post). Sometimes, community members have a choice on how to display threads.

Tools—GUI applications that affect the state of other tools and media-layers.

Tool: scene manager—specific GUI applications that affect the overall display of the stage.

Web based shared space—This describes a single point of reference for multiple users to access and add and modify information from a web browser for viewing by others via that same point of reference.

WIKI—A website that allows the visitors themselves to easily add, remove, and otherwise edit and change available content, and typically without the need for registration.

Whiteboard—a drawing utility, commonly supplied as part of a collaboration framework to allow distributed users to share a common drawing space.

SUMMARY OF THE INVENTION

The present invention relates to the field of collaborative computing, and more particularly to a method and system for creating a collaborative file in a shared network, including: accessing one or more user machines in a shared space, wherein the shared space is created by interaction of executable codes in a host and a user application and the shared space is described by a session attribute list; loading a media application with tools into one or more user machines; using a stage manager tool from the media application to stage and correlating one or more media-layer events according to spatial, temporal and relational coordinate data in the user application, wherein the media-layer events are described by at least a user, a media-layer event designation, a time and command; recording one or more of media-layer events and the associated user, a media-layer event designation, a time and command; and accessing said one or more of media-layer events based upon one or more of the associated user, media-layer event designation, time and command.

A computer system for creating a collaborative file in a shared network including: one or more user machines in a shared space, wherein the shared space is created by interaction of executable codes in a host and a user application and the shared space is described by a session attribute list; executable code for loading a media application with tools into one or more user machines; executable code for using a stage manager tool from the media application to stage and correlating one or more media-layer events according to spatial, temporal and relational coordinate data in the user application, wherein the one or more media-layer events are described by at least a user, media-layer event designation, time and command; a recorder for storing one or more multi type media layers and the associated user, media-layer event designation, time and command; a playback device for accessing said media-layer event based upon a user, media-layer event designation, time and command; and an output device for selective viewing of said media-layer event based upon a user, media-layer event designation, time and command.

The invention further relates to a method of filtering one or more multi-layer events according to one of user, media-layer event designation, time and command. In one embodiment filtering allows users within the shared space to filter user inputs such as one or more media-layers, user comments, notes, and drawings. In yet another embodiment filtering by a user would temporarily conceal from the display output all other media-layer content except for the selected user or filtering of a selected user, media-layer event designation, time and command.

The invention further relates to a method of searching one or more messages according to one of user, media-layer event designation, time and command. In one embodiment searching allows users within the shared space to filter user inputs such as one or more media-layers, user comments, notes, and drawings.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein:

FIG. 1C1 is an embodiment of a system illustrating the process of establishing and operating a session within a user application such as a web browser using various tools in an application in accordance with an embodiment of the invention;

FIG. 1C2 illustrates another embodiment of various components of a Flash application tools interacting with the user's media-layers during a session in accordance with an embodiment of the invention;

DETAILED DESCRIPTION OF THE PREFERRED EMBODIMENTS

Figure 1A:
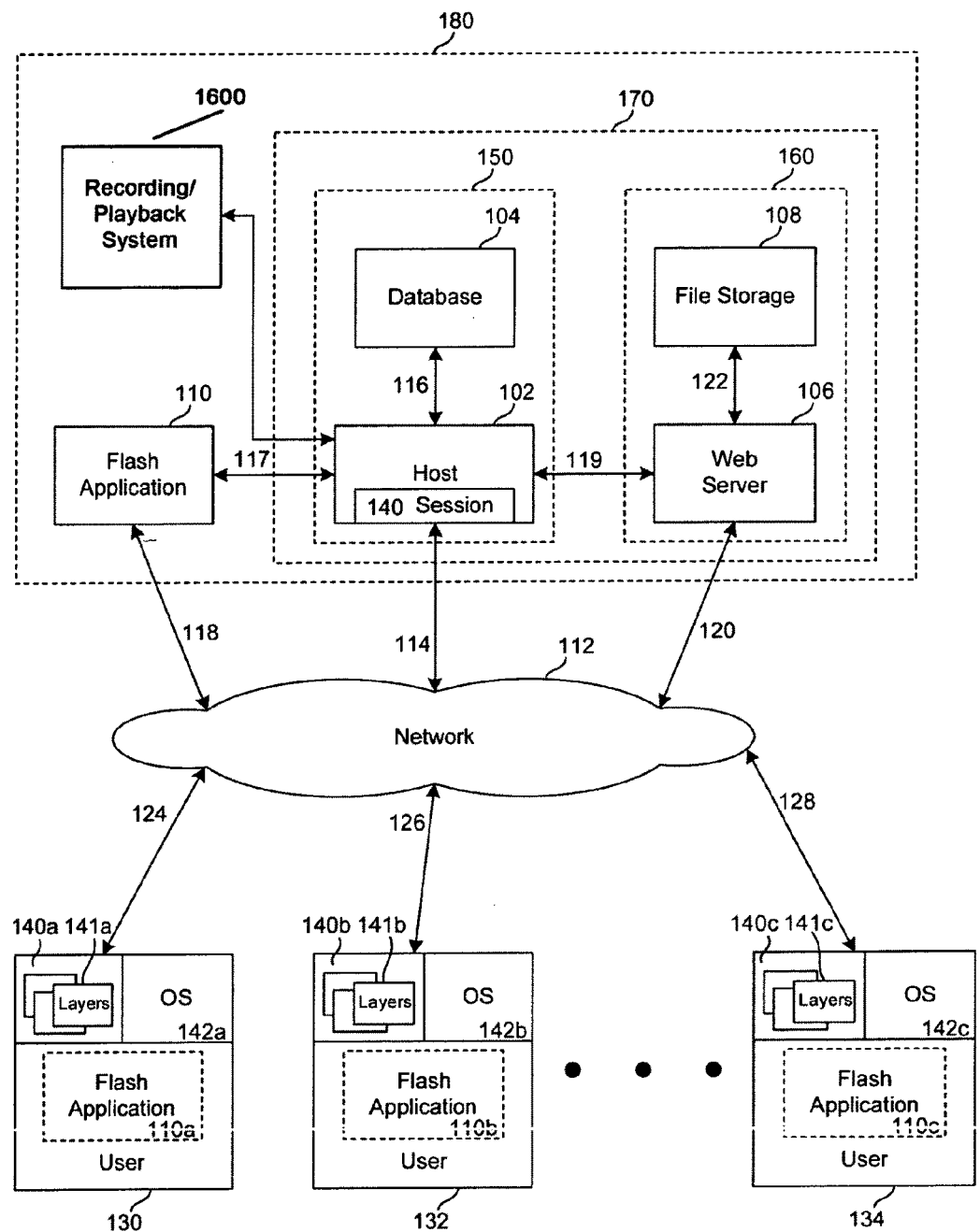
FIG. 1A depicts the embodiments of a system to create a session in shared spaces for the collaborative web-based media-layered platform in a network envitonment in accordance with an embodiment of the invention.

The following description includes the best mode of carrying out the invention. The detailed description is made for the purpose of illustrating the general principles of the invention and should not be taken in a limiting sense. The scope of the invention is determined by reference to the claims. Each part is assigned, even if structurally identical to another part, a unique reference number wherever that part is shown in the drawing figures.

The present invention, relates to the field of collaborative computing, and more particularly, to a system and method for providing a browser-based program to create, and configure a shared space whereby multiple users can access this shared space to perform tasks and interact such as input, modify text and delete images, drawings and other multimedia via media-layers in a real-time synchronous manner. As indicated above a shortcoming with the prior art collaborative systems is rectified by this invention wherein individuals who are participants to group projects can determine who contributes content and furthermore allows the content to be searched on the basis of user, event, time and command creating features of the content.

A shared space is defined as a virtual reference point whereas multiple users can interact in real-time upon shared objects. It is a conceptual construct created by processing executable machine codes from a plurality of programs or plug-ins typically using Flash Virtual Machine (VM) or Java VM. A session is defined as the state of all objects, GUI tools and controls, and media-layers, at any given time within the shared space. Each media-layer can serve as a container for shapes and objects as well as other programs such as a text editor, thumbnail viewer, MP3 player, games, etc. The invention also allows which media-layer(s) to display via organization metaphors and filtering criteria based upon UET and commands. The invention also allows for offline or unsynchronized interaction with objects of a session. Offline events are recorded for later integration with the session.

FIG. 1A of the present invention relates to a distributed web based conferencing system, apparatus and method, which includes at least one central processing computer or computer network server. FIG. 1A depicts the basic foundation of the invention of system 100A to create a session 140 in shared spaces 140a to 140c for multiple users to collaborate on a web-based platform with created media-layers 141a to 141c within a network 112 environment. The system 100A is derived from four main components: Client or user machine(s) 130 to 134, host server 170, database 104 storage device, file storage 108 which is accessible through a web server 106. Each component may be on the same machine or separate machines. It is not necessary that each machine is of the same OS, nor CPU, type. Servers 150, 160 include at least one controller (not shown) or central processing unit (CPU or processor), at least one communication port or hub, at least one random access memory (RAM), at least one read-only memory (ROM) and' one or more databases such as database 104 or data storage devices 108. All of these later elements are in communication with respective CPUs to facilitate the operation of the host server 170. The server 170 may be configured in many different ways. For example, host server may be a conventional standalone server computer or alternatively, the function of server may be distributed across multiple computing systems and architectures.

Server 170 also may be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers such as web server 106, or user computers (e.g., 130, 132, 134) and other related devices. The communications hub or port may have minimal processing capability itself, serving primarily as a communications router establishing a corresponding link 119 with the web server 106. A variety of communications protocols may be part of the system, including but not limited to: Ethernet, SAP, SAS™, ATP, Bluetooth, GSM and TCP/IP.

Data storage devices such as file storage 108 may include a hard magnetic disk drive, optical storage units, CD-ROM drives, or flash memory. Data storage devices contain databases such as database 104 used in processing transactions and/or calculations in accordance with the present invention, including at least a user subscriber database and a user content database. In one embodiment, database software creates and manages these databases. Conference related calculations and/or algorithms of the present invention are stored in storage device and executed by the corresponding CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing.

The data storage device may store, for example, (i) a program (e.g., computer program code and/or a computer program product) adapted to direct the processor in accordance with the present invention, and particularly in accordance with the processes described in detail hereinafter; (ii) a database adapted to store information that may be utilized to store information required by the program. The database includes multiple records, each record including fields specific to the present invention such as membership rates, subscribers, sessions, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as alternative steps of invention. The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or datastreams that carry various types of information.

Server 170 of the present invention may also interact and/or control one or more user devices or terminals (e.g., 130, 132, 134). The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

The shared spaces 140a to 140c emulate and share the contents of the session 140 where executable machine codes in both the client or user machines 130 to 134 and the host 102. The executable codes in each machine may be different, but the intended results of the invention are achieved. The state of the session 140 is maintained on the host 102 during a live session 140, then the database 104 at the end of a session. All client or user machines 130 to 134 that are logged into a session 140 are constantly updated with changes to the session 140 in real time. If permissions are granted, any client can initiate a change to the state of the live session. Once this change has been sent, all client machines 130 to 134 are updated with the change.

The system 100A comprises of a host 102 in synchronous communication with one or more user machines 130 to 134. In an embodiment, the host is a server in communication with a database 104; where the host is also in communication with a web server 106 that communicates with a file storage 108. The database 104 can be in a separate server, or can be part of the host 102 within the same server 150. Similarly, the web server 106 and the file storage 108 can be separate units or can be integrated into a server 160. Yet in another embodiment, a host 170 is a server including the functions of the database 104, the web server 106 and the file storage 108. The physical location of the database 104, file storage 108 and the method of writing the machine executable codes being integrated into the host server 102 is not important to the invention as long as the functions are accessible to the host 102 and to the user machines 130 to 134.

In an embodiment, each of the user machines 130 to 134 has an operating system 142a to 142c such as the Microsoft Windows XP®, Linux®, Macintosh OSX® or any third party operating system. The operating system in each of the user machines 130 to 134 need not be the same as long as it supports a web browser or other application to access the internet and supports the execution of codes to facilitate the intended media functions of the invention. In another embodiment, compiled Flash VM executable codes of the application 110 are downloaded before the creation of a shared space 140a to 140c to each of the user machines 130 to 134 from the host session 140 through the network 112 and links 124 to 128. Yet in another embodiment, the application 110 can be native to each of the user machines 130 to 134 as media applications 110a to 110c.

One or more media layers 141a to 141c are created and respective media tools are from media applications 110a to 110c is generated by the interaction of the codes in the user machines 130 to 134 and the codes from the host server 180. The network 112 and the corresponding links 114, 118, 120 to 128 are part of the Wide Area Networks (WAN), Local Area Network (LAN) through Ethernet connections or wireless connections. Yet in other embodiments, the network and the links can be Local Optical Networks (LON) or direct fiber optic links or direct terminal connections or plain old telephone service (POTS). In all forms of link communications within the network 112, the communications can be enhanced with known encryption protocols to improve security.

All services as contained within the host server 180 are equipment selected from the list to include a server, work station, personal computer, laptop computer, Personal Digital Assistant (PDA), an Intelligent Electronic Device (IED) or any suitable computing platform with sufficient memory and processing power to perform the functions as a server in a network environment. The user machines 130 to 134 are equipment selected from the list to include a server, work station, terminal, personal computer, lap top computer, Personal Digital Assistant (PDA), electronic tablet, handheld wireless device, a cellular phone, an Intelligent Electronic Device (IED) or any suitable computing platform with sufficient memory and processing power to perform the functions as a user machine to perform media inputs in a network environment.

Yet in other embodiments, the system 100A can be extended to include broad applications such as web conferencing, local conference presentations projecting synchronized annotations or pointing tool to contents on multiple screens to mass audience, online interactive courses and tutoring, live interactive interviews to multiple interviews in different geographical locations, interactive debate forums using multimedia, interactive cellular phone chats and games, secured synchronized interactive voting method combined with secured voter identification, live military battlefield operational command, remote interactive clinical instructions and operation training procedure; and electric power utility interactive service, support and trouble shooting etc. Said examples and the contents desired for the execution of said example can be assembled before and during synchronized events. Content can also be made available in an unsynchronized fashion such that independent content review or read only publishing can be supported.

Figure 1B:
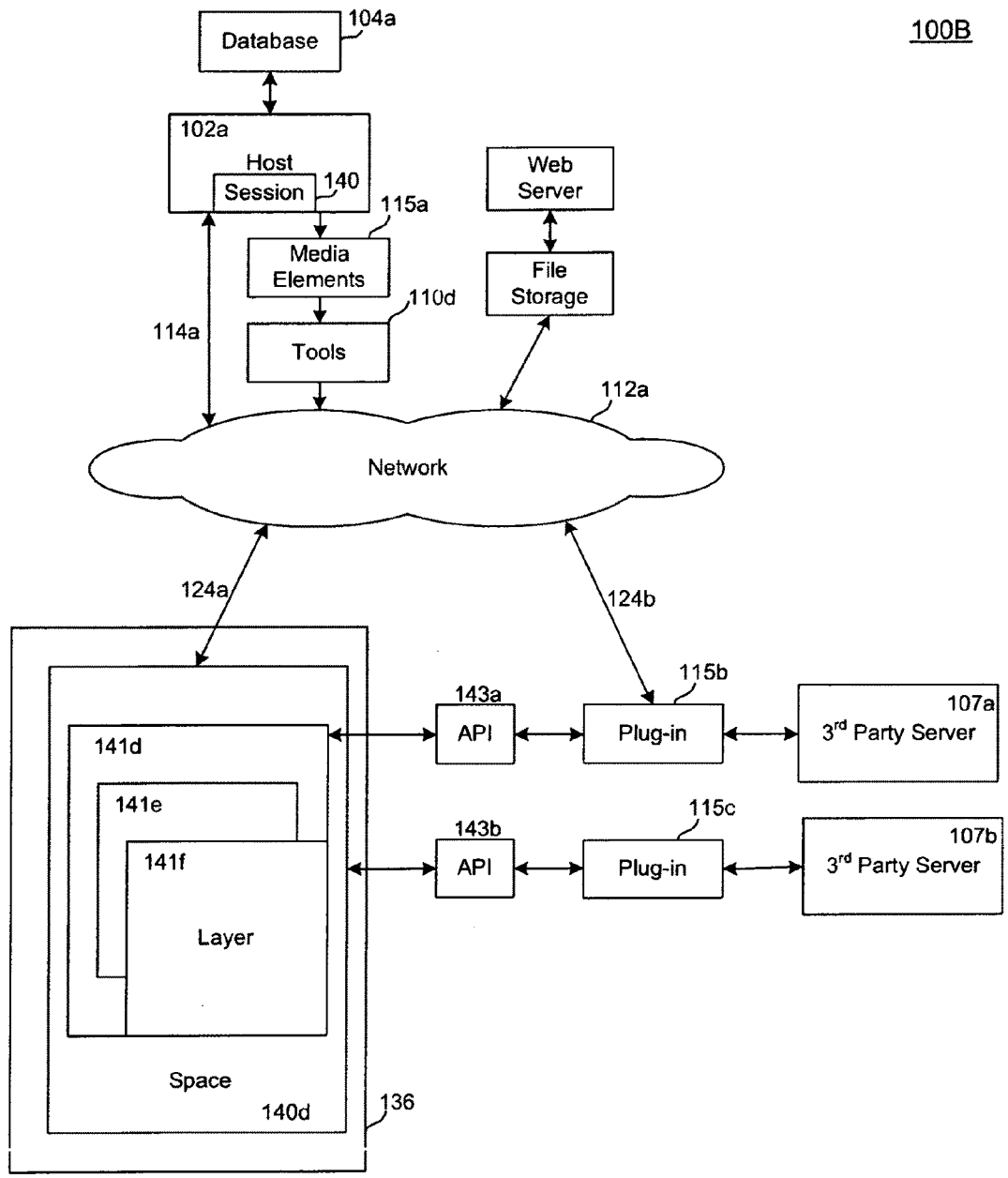
FIG. 1B illustrates the system initiation to create a session of collaboration in media-layers in accordance with an embodiment of the invention.

FIG. 1B illustrates the system 100B initiation to create a session 140 of collaboration in media-layered 141d to 141f within space 140d that holds media elements 115a, tools 110d (Flash application tools) or plug-ins 115b and 115c. Plug-ins 115b and 115c are independent applications that must conform to the system's API 143a, 143b as well as be compatible with the system's runtime environment. For example, if the client system is a macromedia Flash application, then the plug-in 115b and 115c must also be a Flash application. Said plug-ins 115b and 115c can be accessible either locally from the client machine 136, or through a local connection, or a network 112a. A plug-in 115b or 115c can, however, manage the execution of the tools of an application not of the same executable code base as the client application. For example, a Flash plug-in 115b or 115c can manage the execution of the Java application as relevant to the client machine 136.

In an embodiment, the initialization of the system 100B (in the synchronized state) requires that the user's or client's machine 136 has internet access through link 124a to network 112a and the ability to support compiled Flash based applications. A typical configuration will involve the use of a common web browser with a flash plug-in and JavaScript enabled. Through the use of a URL, the user or client makes a request to join a session 140 by sending login credentials to the host 102a. The host 102a in turn will query the database 104a to determine the tools 110d that must be downloaded and the current session 140 state parameters. In addition, plug-ins 115b and 115c are sometimes downloaded from third party servers 107a and 107b. Instruction and location of said plug-ins 115b and 115c are provided by the host 102a.

The host 102a first sends a base application that provides a synchronizing connection between that user 136 and the host 102a. A standard socket connection is established. Should this fail, High Ports are tested for the ability to exchange data. Should this fail, ports 80 and 81 are checked via standard HTTP protocols. Once a connection by links 114a and 124a from the user 136 to the host 102a has been established, the host 102a will send a list of required application tools 110d to be loaded by the user machine 136. By only loading those tools 110d that are required, the system in the user's machine 136 will start faster with a lower memory requirement. Should the user choose to run in 'thin' mode, those tools 110d that are only needed on demand will be loaded into memory during their use and unloaded after their use is no longer required.

FIG. 1C1 is an embodiment of a system 100C illustrating the process of establishing and operating a session within a user application such as a web browser 140j using various tools in Flash application 110e. When a user 135 logs onto the system 100C via the internet, LAN or WAN 112b, the user 135 is registered in a shared virtual environment (session 140k) based on user's credentials and other parameters supplied at log on. In this exemplary example, the flash application 110e is loaded on to the client's machine 135 by the client's web browser 140j. This flash application 110e in turn, loads a communication synchronizer application 113 that contacts the Host's server synchronization service 102d and requests to be registered with a particular shared space for a session. Once this connection has been established, all communication between the client application 110*e* and the host sync service 102*d* happen between these two applications.

Based on user credentials and other parameters supplied, a list of tools and their location(s) on the file storage server(s) 108*a* is generated. This list is passed to the flash application 110*e*. The flash application 110*e* then loads a stage manager tool 1100*b* into the buffer memory from the web server 106*a*. This tool 1100*b* creates and manages the stage 1102*b*. Once this is done, the flash application 110*e* then sends a message back to the file storage server 108*a* via sync application 113.

One of the tools that are loaded is the stage manager 1100*b*. This tool 1100*b*, once loaded, looks at the attribute list of the current room for the session. One item on that list is the type of layout to be used on the stage. If any other layout is defined besides 'default', additional tools 1104*b* are downloaded to support the additional features. The stage manager 1100*b* is then provided a list of media-layers 1108*b* to 1112*b*. Those media-layers that are listed as 'active' should be currently displayed. Active media-layers 1108*b* and 1112*b* are accessed, loaded and displayed on the stage 1102*b*. Once complete, non-active media-layer(s) 1110*b* are downloaded and stored in cache memory in a prescribed order if this option was selected. All of the media-layers together, both loaded and unloaded, 1108*b* to 1112*b* are called a 'collection'.

The relationship of all media-layers 1108*b* to 1112*b* to each other can be stored in an XML file known as the 'collection'. The most exemplary example is the default stage manager system where all media-layers are displayed using the Cartesian coordinate system where the y axis is inverted. An example XML collection file follows: TABLE-US-00001 . . . <collection type='book_simple' label='my book' authorID='23jkl4johnsmith' . . . > <tools> <page_navigator pluginRef=" . . . /plugins/book_nav.swf"/> <page_thumbnail_viewer pluginRef=" . . . /plugins/thumb_view.swf"/> . . . <tools/> <layer ID='a' label='title page' parent='top' z=0 . . . > <children 0='b'/> . . . <layer/> <layer ID='b' label='title page' parent='a' z=1 . . . > < . . . .

The stage manager tool 1100*b* then checks to see what type of collection has been loaded. In this case, it is a 'book_simple' type collection. The tools 1104*b* required for this type of layout is listed in the 'tools' section of the XML. The client flash application 110*e* then downloads into memory those tools 1104*b* listed.

FIG. 1C2 illustrates another embodiment of various components of the Flash application 110*e* interacting with the user's media-layers 1108 to 1112 on the stage 140*f*. Although there are a number of possible combinations of tools that can be loaded, the one tool that is always loaded is the stage manager 1100. The stage manager tool 1100, among other things, established the coordinate system and layout format that will be populated by media-layers 1108 to 1112. The most typical configuration of the stage 1102 is a two dimensional cardinal system where 0,0 is located on the upper left most side of the application window placed just under the displays for session and user information and controls. These controls are typically displayed at the top of the application window. The list of active media-layers 1108, 1112 are passed to the stage manager 1100. The media-layers 1108 and 1112 that are tagged as 'visible' are loaded first and then displayed in a stage 1102.

A media-layer is a container that serves as a reference point for media as well as other media-layers. Since media-layers 1108,1110 can be attached to another media-layer 1112, nesting of media-layers can occur. For example, a 'parent' media-layer 1112 contains an image of a human face on it. A 'child' media-layer 1110 is nested on top with a mustache drawn over the face, and another 'child' media-layer 1108 is nested on top with eye glasses drawn. When the parent media-layer's 1112 object is moved or hidden, the two child media-layer's 1110 1108 objects will also move or be hidden, thus maintaining their visual relationship. Each child however can have its visibility setting changed by a parent or another, media-layer in the patriarchy. A media-layer from outside the patriarchy cannot modify a media-layer unless such functionality is support by the system's API.

The issue of concurrent users in making an annotation to the media layer is addressed next. Unique to this invention is that ability to share in real-time, near real-time as well as maintaining persistence, the ability to create, modify and delete media-layers and the media elements associated with those media-layers and regulate access to those media-layers. In addition, all tools and User Interface (UI) elements can be controlled at runtime based on commands from the stage manager. As such, not all users logged into a shared space will see that same thing if such modifications are selected. For example, the administrator of the shared space may wish to have all the tools made available to him or her. However, all other users who are of type 'guest' will not see any tools. Those users who are of type='invited' may see only a subset of tools that the administrator sees.

When a user is logged into the system, actions that are performed on the media or changes to the media-layer's attributes are tracked and sent to the server. The server maintains a log of the actions and the resulting status of media-layers and their media. The server then repeats the actions to all users who are logged into the same session. When users enter in to a session, they immediately load all active media-layers, media and plug-ins. In this way, every user who is logged into the system has a copy of the media elements and only has to execute the actions that were sent by the server. Since all users can (if allowed by the administrator) have their action communicated back to the server, everyone's actions within the space is reflected on the display of all concurrent users. If the administer allows more then one user access to a media-layer, then only one action may occur at one time within a media-layer. In other words, if a user initiates an action, no other actions can take place until the first action is complete. Concurrent actions can occur on separate media-layers. The administrator can select that all actions on media-layers are NOT locked. This means that if two users click on the same media-layers media, then whomever's event is sent last, will have said event respected unless the object is deleted or somehow unable to execute the later event.

A whiteboard tool perform the unique function of creating a new media-layer every time a line is started and then stopped. Each line and/or shape in the whiteboard tool library is treated like an individual object on its own media-layer.

For whatever metaphor employed, the information required to create and support an ordering construct is managed by the stage manager. All rights to what media-layers and tools are loaded, seen and how they function is controlled by the user or administrator who created the space (account). The administrator can pass the rights of a media-layers and tools to anyone(s) or to everyone.

Figure 1G:
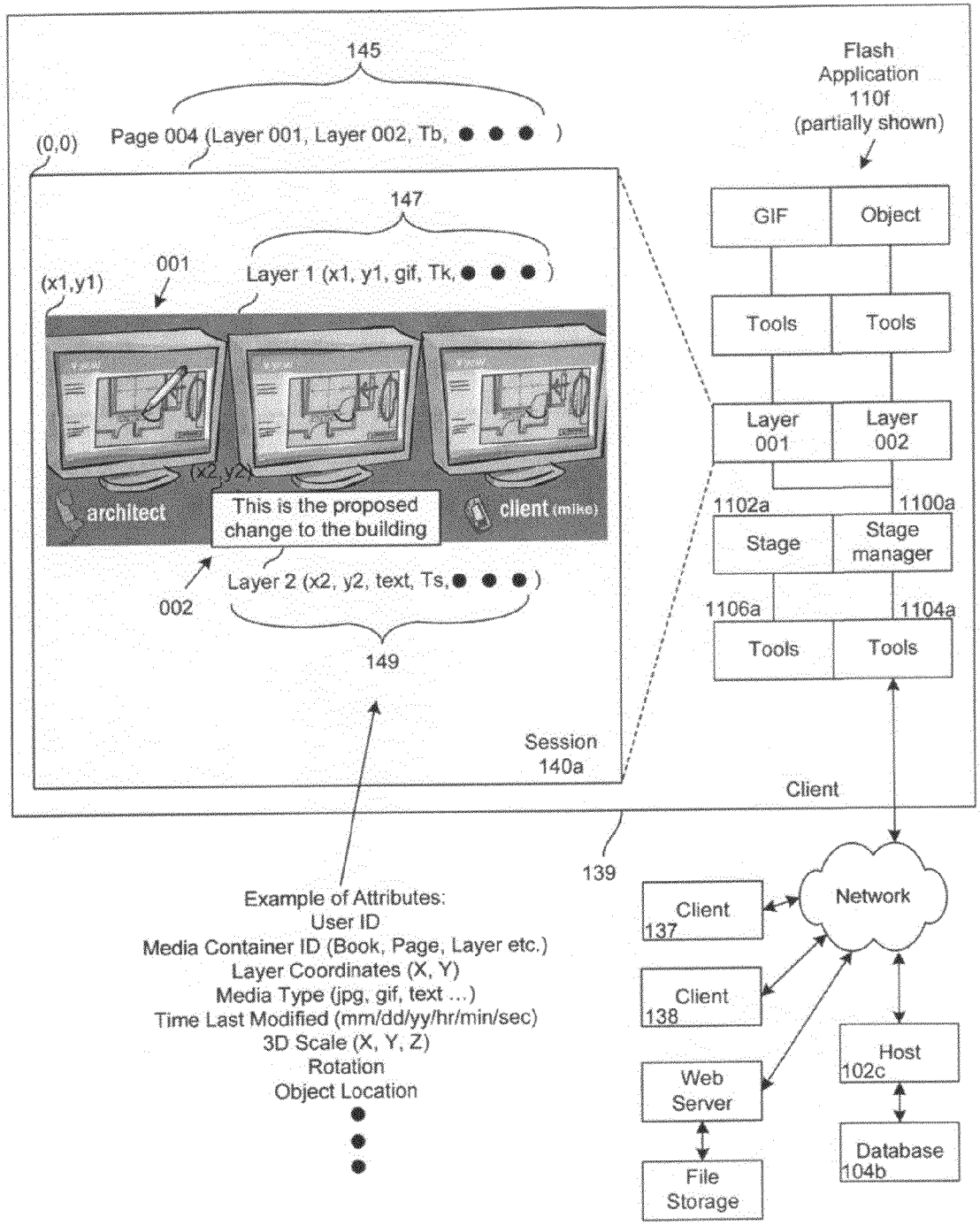
FIG. 1G illustrates an example of staging and synchronizing media-layers using a Flash application tool for the construct of a page as a collection of media-layers in accordance with an embodiment of the invention.

FIG. 1G illustrates an example of staging and synchronizing media layers using a Flash application tool for the construct of a page 004 as a collection of media-layers 001 and 002. Each media-layer 001 or 002 has attached to it, a set of corresponding attributes 147 or 149 that inform the stage manager 1100*a* also shown as 1100*b* in FIG. 1C1 on how to manage a respective media-layer. For example, media-layers with the media-layer ID 001 and 002 respectively have been placed on the stage 1102a of a Flash application 110f to be displayed. Media-layer 001 may have the following attributes: Layer ID (001), Position X1 (30), Position Y1 (30), Position Z (0), Scale in X (100), Scale in Y (100), Scale in Z (100), Rotation (0), location of media object ( . . . //arch_exmpl.jpg), type of media object (image), Date Created (some date), Date last modified (some date), Date deleted (some date), ID of the user that created this layer (jones43), etc. From this information, the stage manager will know to load a jpg image from a given location and display that image, unaltered 30 units to the right and 30 units down. Media-layer 002 may have the similar attributes with Position X as (40), Position Y (40) and Position Z (1). In this case, the text field would appear within the application with the image in media-layer 001 under the text of media-layer 002. If another user with a client machine 137 or 138 accesses this same session, then the same steps will repeat, thus assuring that both client machines 137 and 138 are displaying the same thing.

Interacting with media objects in a synchronized mode is discussed next. The stage manager tool 1104a of the system 110b insures that all changes in state of a media-layer or actions that are passed to the media-layer from that media-layer's contents, is communicated to the host server 102c to either be recorded, or sent to some or all of the other client machines 137 and 138. This is accomplished by the host server 102c maintaining a list of all subscribed client machines 137 to 139. As an event is received from a client machine 139, that event is logged and stored either on the host server 102c and/or on the database 104b. This event is then passed to the rest of the client machines 137, 138 on the subscriber list. The event is then replicated on all client machines 137, 138, however, in rare cases, an exception rule can intercept the event and then follow a defined action which may or may not mimic the original event. For example, a client machine 137 may click on an object in a media-layer 002 thus making that object interactive. The client 137 then moves the object 002 from one location to another, thus creating an event. The changed media-layer attribute 149 information, in this case Position X, Position Y, date last modified, to the host server 102c as an event. The host server 102c records this new information and then sends this event information to all subscribed client machines 137 to 139. Users on the client machines 137 to 139 would then see the same object from the original location to the new location as indicated by the terms of the event.

Figure 2A:
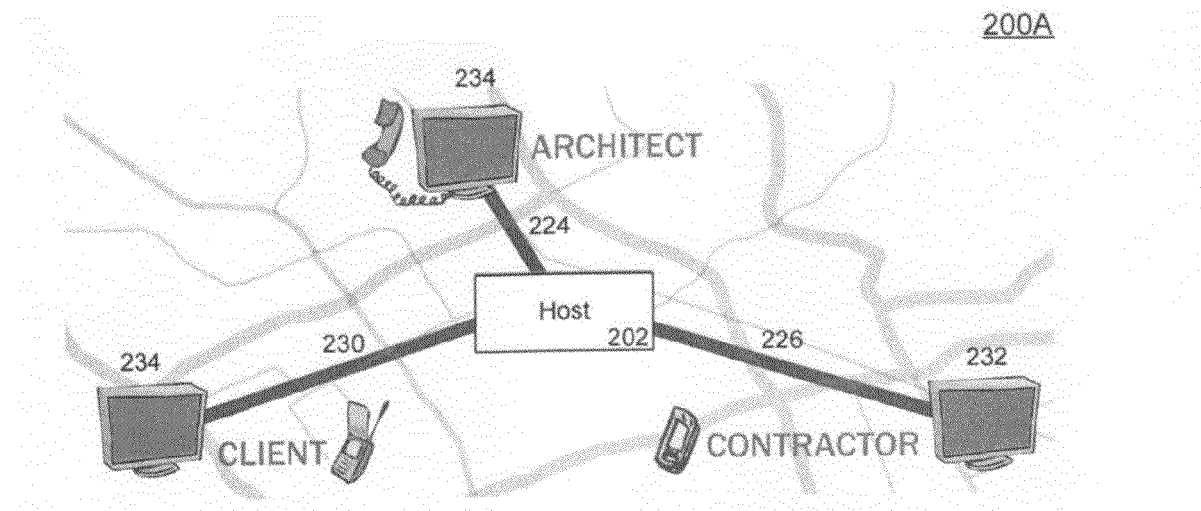
FIG. 2A illustrates an example of collaborative actions in a web conferencing environment in accordance with an embodiment of the invention.

FIG. 2A illustrates an example of collaborative actions in a web conferencing environment 200A. Users 230 Client, 232 Contractor and 234 Architect hold a teleconference in separate geographical locations. A virtual shared space is created when users 230 to 234 are logged into a common session through synchronous communication links 224 to 228 with host server 202.

Figure 2B:
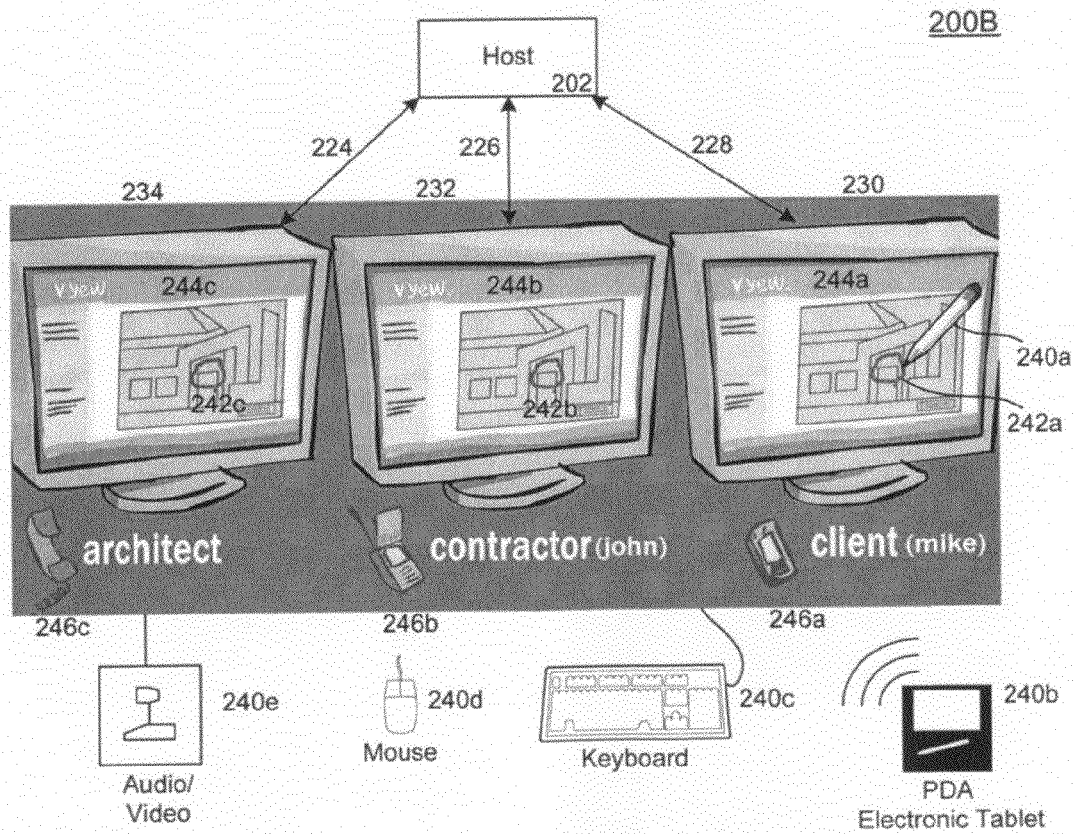
FIG. 2B illustrates an example of synchronizing an annotation of a drawing in a shared space through various input devices in accordance with an embodiment of the invention.

FIG. 2B illustrates an example of synchronizing an annotation of a drawing in a shared virtual space 244a to 244c through various input devices 240a to 240e during a web conferencing environment 200B. In an embodiment, the shared space 244a to 244c is a web-based shared environment such as a web browser where multiple users 230 to 234 can create, transform and delete a wide variety of media as well as annotate over or under said media. The example in FIG. 2B illustrates that user 230 as client Mike annotating a circle 242a over an image of a floor plan displayed on the computer monitor using an electronic or optical pen 240a. This action is synchronized and displayed on those sharing the same virtual space 244b as 244c in user 232 contractor John and user 234 Architect's computer monitors. All actions from any of the users 230 to 234 are also stored on the server 202 for later retrieval. If users 230 to 234 annotate the floor plan drawing at same location at the same time, the last input to the shared space 244a to 244c will be recorded and shown on the computer monitors.

Alternately, other input devices such as, but not limited to, a wireless PDA or electronic tablet 240a, a keyboard 240c, a mouse Z40d, optical pointer, USB flash memory, stylus, audio or video equipment 240e, such as a video camera or microphone or both, can also be sent as inputs to the shared space 244a to 244c. The cellular phones 246a to 246c voice input can be integrated as a media-layer over the other text or graphic layers during the teleconferencing.

The shared environment is multi dimensional thus allowing users 230 to 234 to sort information by not only content, but spatial, temporal and inter relationships between the media-layers created. Because the shared space 244a to 244c is virtual and not restricted to one image, more then one media can be placed within the same shared space 244a to 244c.

FIGS. 3A to 3E are various browser screenshots 300A to 300F of a Graphical User Interface (GUI) illustrating a plurality of executable tool functions including the stage manager tools available for the collaborative media-layered platform. In an embodiment, the GUI shown in FIG. 3A includes standard window's editing tools 304a. The shared media workspace 310 acts as a container to support a plurality of media file formats and plug-in applications where layer-based authoring content can be easily moved, scaled, copied, pasted, layered and deleted. On-demand access to different content or sessions—saved and organized by topic, audience or version for example. A user list 306 and chat configurations 308 are also shown. Some examples include the Microsoft Office® and Adobe® PDF files, real time desktop sharing, photos, etc. shared media workspace 310 can import and export (to PowerPoint or PDF) for asynchronous work or archiving offline. Operation and UI of the client application in an offline mode is similar. This characteristic allows the user to continue annotating the media layer objects when offline (temporarily leaving the session), re-synching to the latest changes on the media layer or to the session when back online. The time and space synchronization of content changes and annotations enable users to publish content anywhere on the web, have presence awareness capabilities to know when other users are interacting with that content, and then interact with that user in real-time.

Figure 3A:
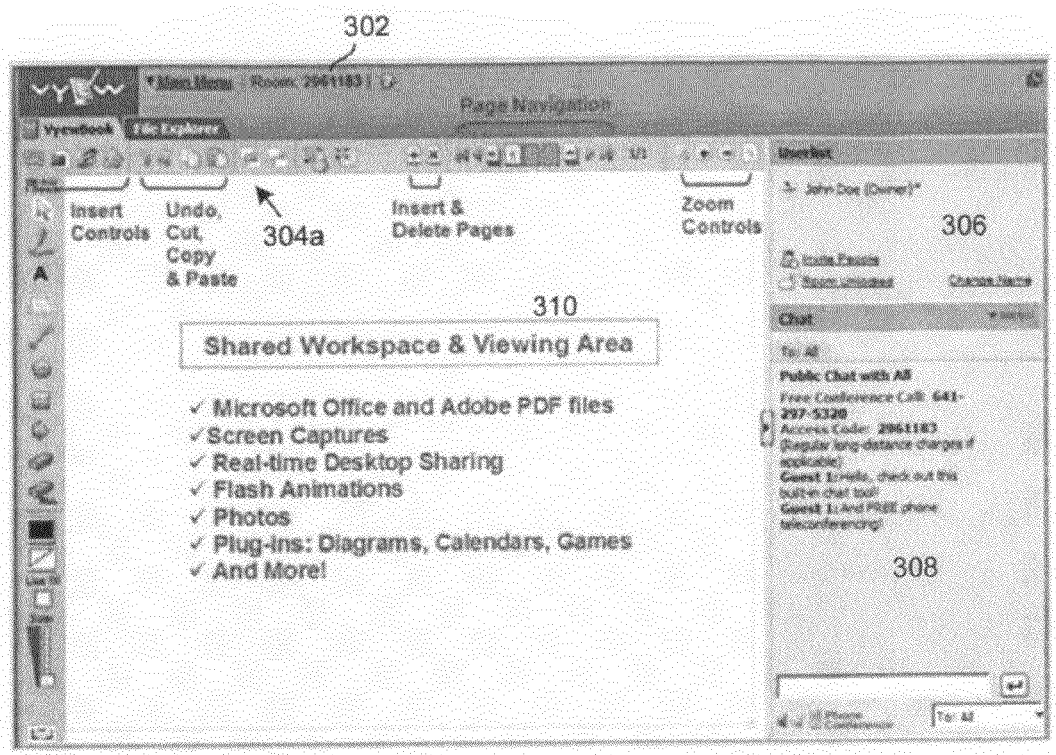
FIGS. 3A to 3F depicts various functions and features of the invention in creating a collaborative multimedia platform in accordance with an embodiment of the invention.
Figure 3B:
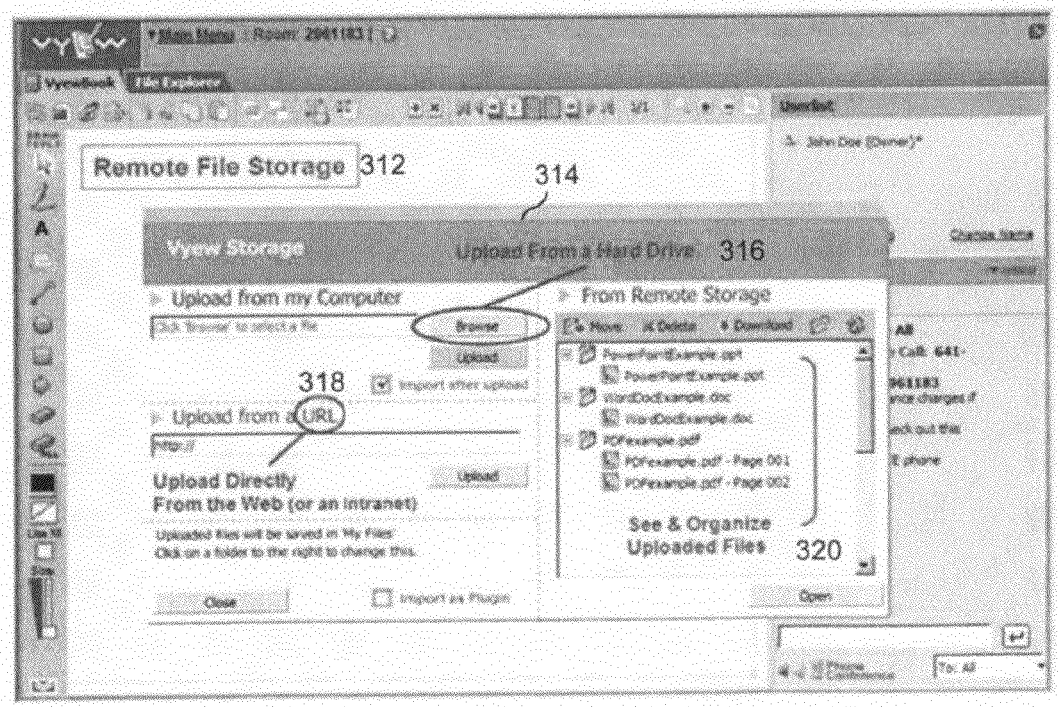
Figure 3C:
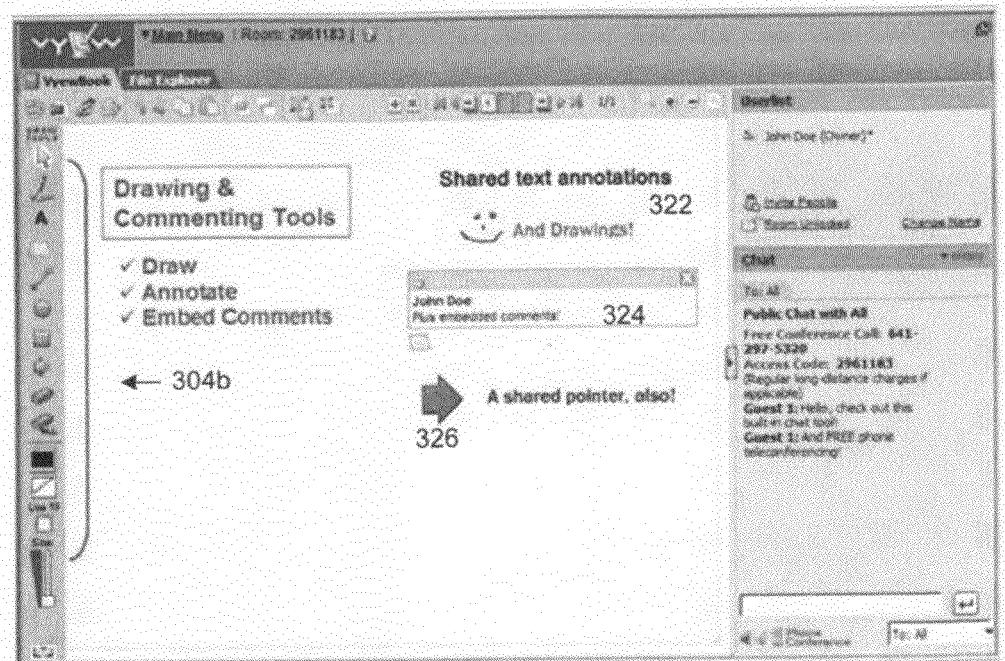
Figure 3D:
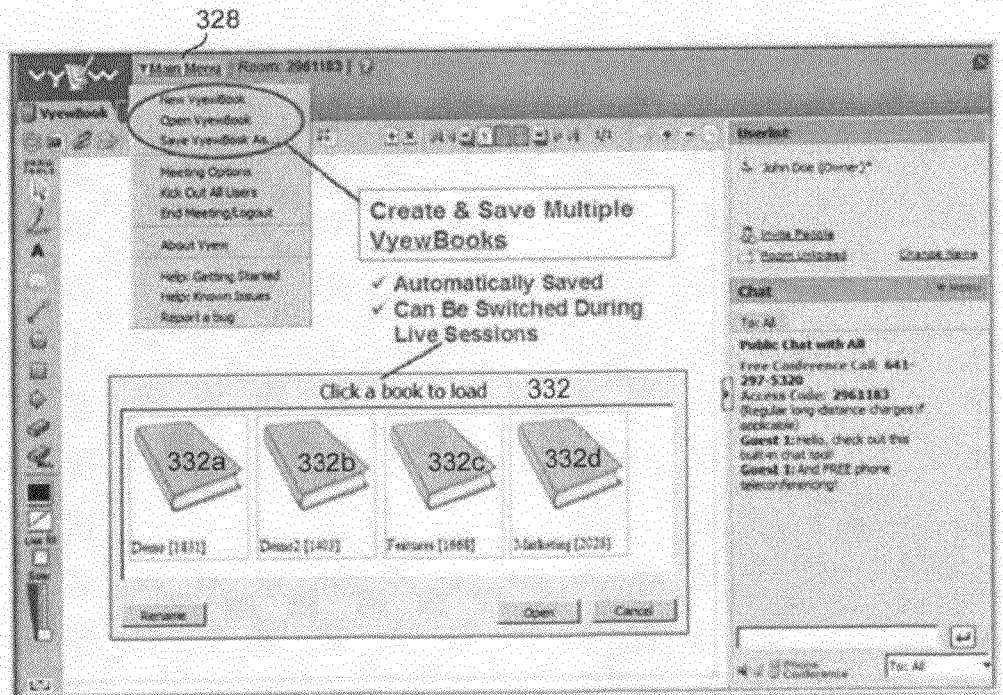

FIG. 3B illustrates another window opened from the tool bar where the upload of files from a file storage remotely 318 or locally from a hard drive 316. For remote locations, files can be uploaded directly by providing a valid URL. A tree structure 320 shows the organization of the files through a web service 106a from a remote file storage 108a such as one shown in FIG. 1C1 or from the local hard drive 316 or other storage devices accessible from a client machine. In FIG. 3C, new media 322 and text 324 can be created as new media-layers using the tools 304b. 326 shows a shared pointer object that maintains its position across all clients in real-time functioning as a surrogate mouse pointer. FIG. 3D illustrates GUI tools invoked to support the book typical metaphor. Using the main menu 328 to open, create or save a collection, illustrated here as a 'book' to be shared and viewed by the users in the session. Books 332a to 332d can be switched during a session by the users.

Figure 3E:
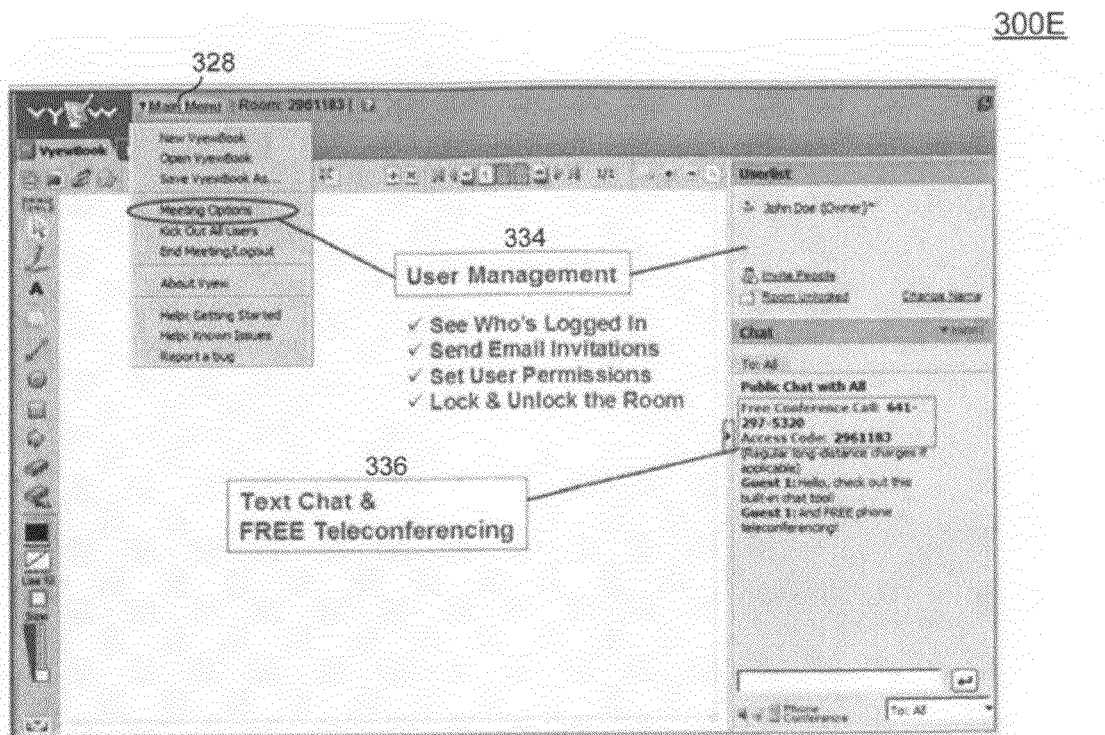
Figure 3F:
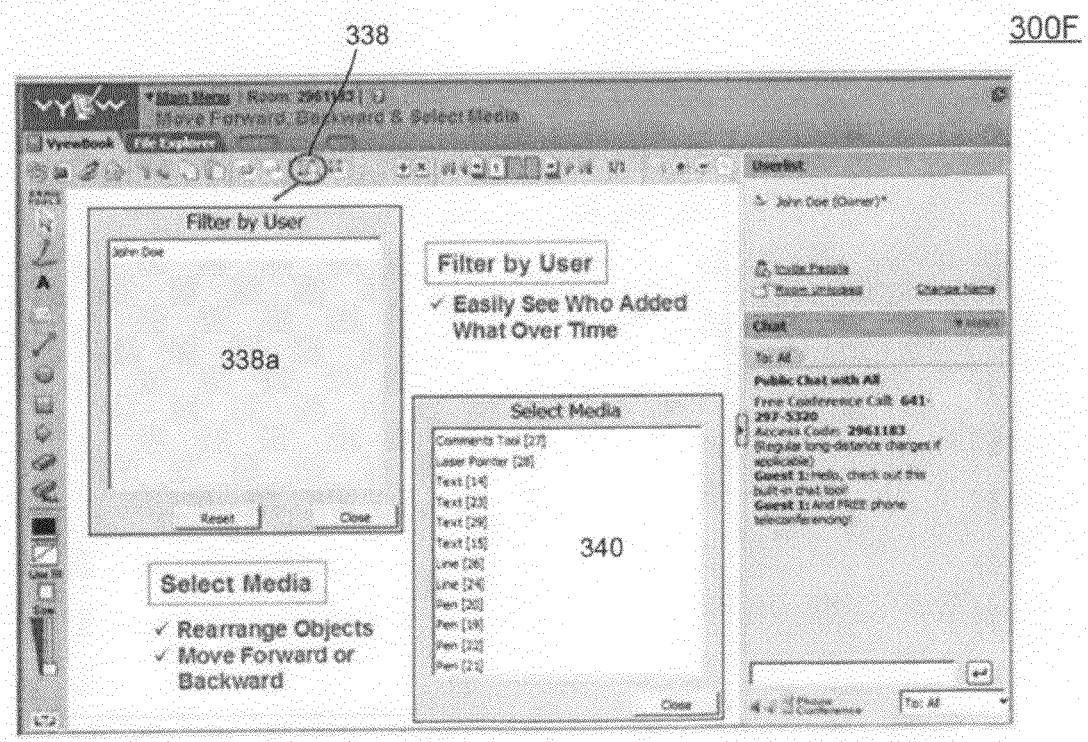

FIG. 3E illustrates the user management 334 function can be invoked by selecting meeting option from the main menu tool bar 328. The user management function allows user to see who is logged in, send email invitations, set user permissions, lock and unlock the room for the shared session. The option of using teleconferencing 336 by using online VOID (Voice Over IP), cell or common POTS while interacting in real time with users during the session can be done by providing an VOIP client or phone number and access code for those users given permission to access said voice service. FIG. 3F illustrates a 'filter based upon UET and commands by user tool' 338 where a window 338a is opened to display the ID labels (name) of all users that have created a media-layer on the current page. Objects can be hidden or unhidden based on the selection of one or more names. This same filtering is also achieved based on the time when media-layers were created and/or modified. Another select media window 340 allows the selection of media-layers based on the media-layer's ID label.

Figure 4:
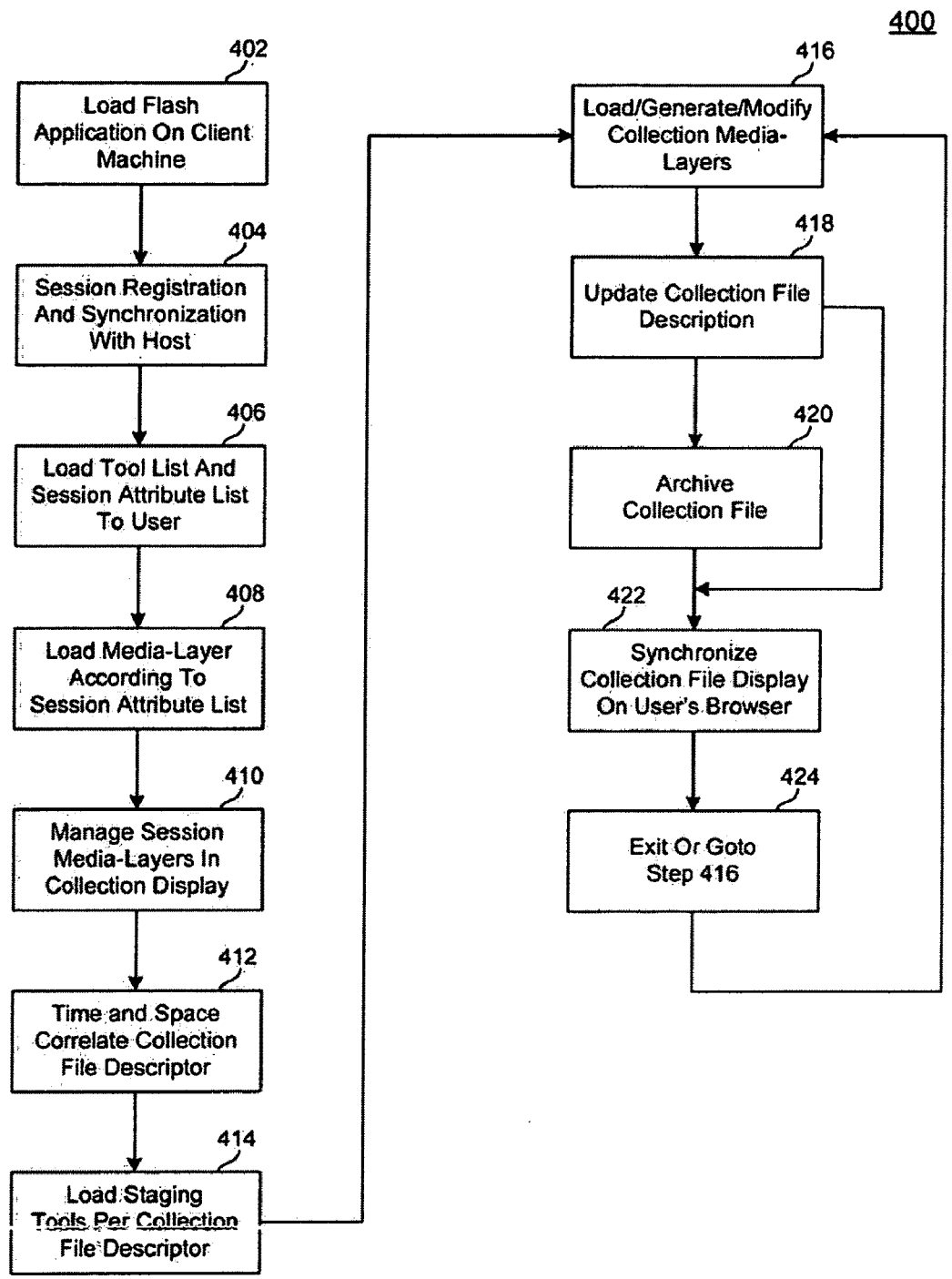
FIG. 4 is a flow chart depicting a method to collaborate a web browser based media-layered session in a network environment in accordance with an embodiment of the invention.

FIG. 4 is a flow chart 400 depicting a method to collaborate a web browser based media-layered session between two or more users in a shared environment. In an embodiment, the shared environment is an Ethernet WAN or LAN network, a fiber optic communication direct link, a Flash application is loaded on each registered client machine in step 402. In step 404 the flash application on the client machine connect to a host server after being authenticated. The host registers the users and opens a session to support synchronous communication. In step 406, the host retrieves from a database the identity of user and sends a tool list to be loaded by the flash application on the client. In step 408, the flash application will load one or more media-layers in response to the receipt of a session attribute list from the host. If no specific attribute is specified, a default media-layer is loaded. One of such tools is the stage manager tool. In step 410 a plurality of media-layers form a collection; where the collection is managed by the stage manager tool, only the active layers are viewable by users; the inactive layers are hidden from view. In step 412, the collection is correlated with information including time last modified and 3D space coordinates into a file descriptor suitable for network equipment communication such as an XML file. In step 414, the user web browser loads staging tools from the stage manager according to the user's collection file descriptor received. The collection file descriptor can be a file from a remote file storage location or from the user's local hard drive. If no particular format is specified, the staging tool will load one or more default media-layers for the session. In step 416, the user can load an existing file with a collection of media-layers from a remote location on the web by specifying URL address or from a local hard drive. The user can also generate new or modify the loaded media-layers. In step 418, the modifications that are user's inputs include annotation, delete, insert, copying, pasting or drawing to the media-layers. The updated collection file descriptor can be stored for later retrieval by the users in step 420, or can be accessed by other users logged in the same session in step 422. In step 424, if all tools and media-layers loads are completed, the process ends until further inputs from any of the users in the session.

Figure 5:
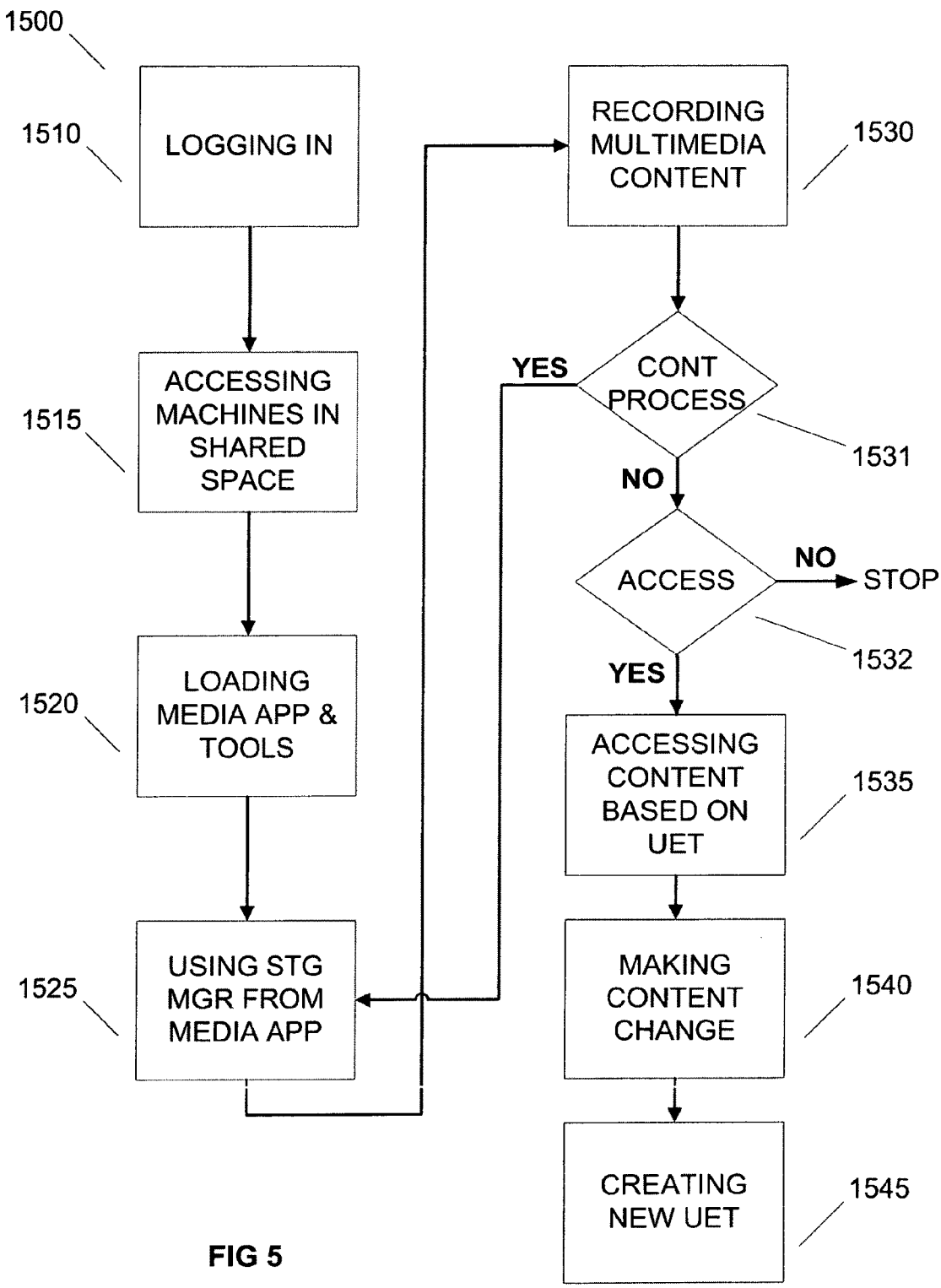
FIG. 5 depicts a flow diagram for performing various functions of the invention for creating a collaborative multimedia platform in accordance with an embodiment of the invention.

FIG. 5 is a flow chart depicting one embodiment of the invention wherein a method 1500 for creating a collaborative file in a shared network includes: logging into a system 1510 as described in connection with FIG. 1A through FIG. 4, accessing one or more user machines in a shared space 1515, wherein the shared space is created, by interaction of executable codes in a host and a user application and the shared space is described by a session attribute list; loading a media application with tools 1520 into one or more user machines; using a stage manager tool from the media application to stage and correlate 1525 media-layer events according to spatial, temporal and relational coordinate data in the user application, wherein the content composed of media-layer events (i.e., an event is a layer or a collection of layers of content) are described by at least a user, media-layer event designation, time (referred to as "UET") and command; recording content 1530 and associated user, media-layer event designation, time and command with one or more of layers for composing multi type media into the shared space. At this point in the method 1500 a user has the option of continuing to process its work, stopping further work for an indeterminate period or accessing content. In decision block 1531 the process continues based upon user preference and proceeds to stage and correlate 1525 media-layer events according to spatial, temporal and relational coordinate data in the user application, otherwise the user makes a decision 1532 to access the media-layer content or stop. and accessing said content 1535 based upon a user, media-layer events, time and command. Accessing content 1535 may include one or both playing the contact back and displaying the content. In a typical collaboration session, the users will make changes 1540 to the content to create new content, wherein the new content is identified by a record of the user, media-layer event designation, time and commands that were used in creating such new content.

Figure 6:
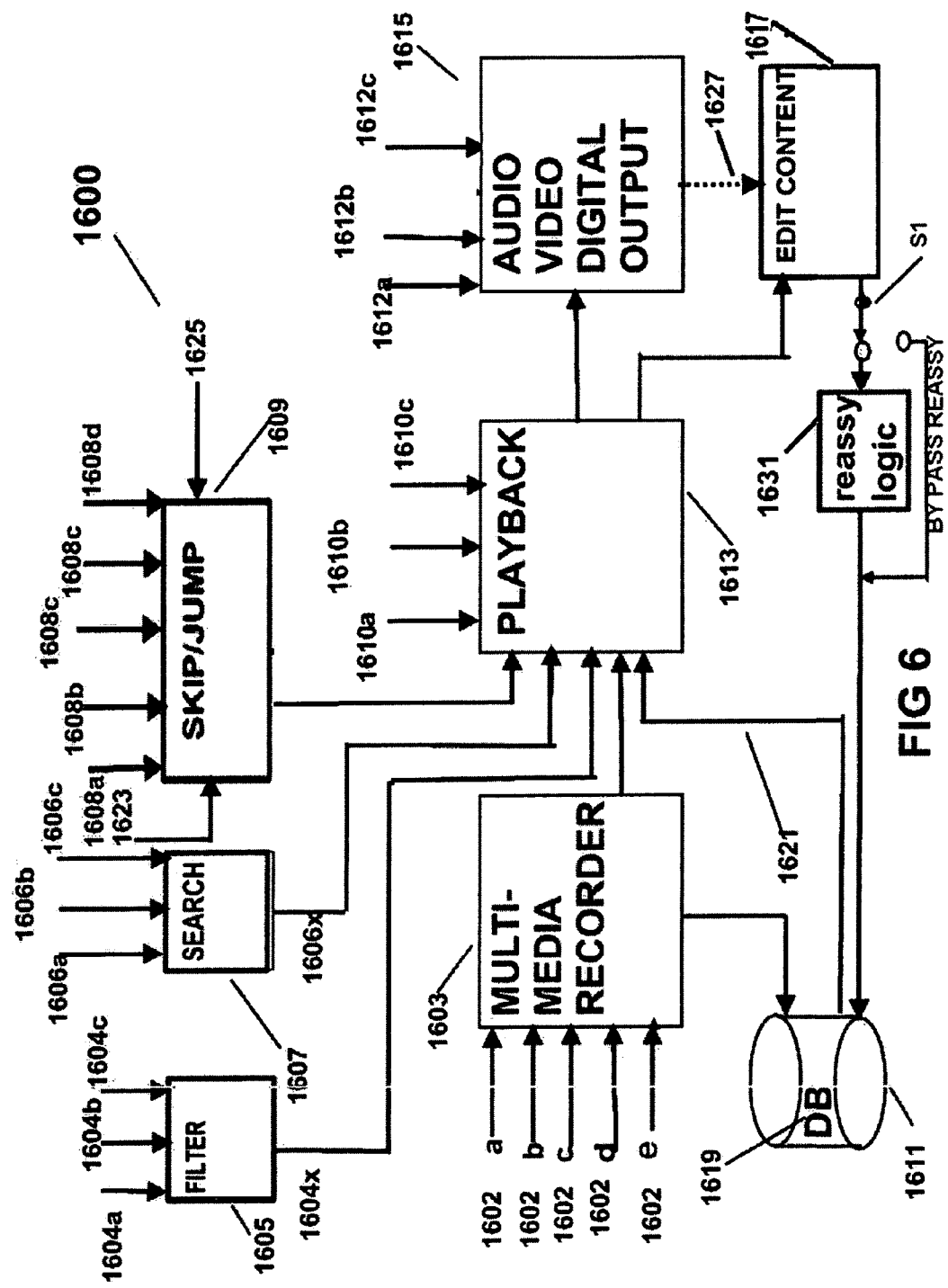
FIG. 6 depicts a block diagram illustrating a recording playback system and collaborative multimedia platform in accordance with an embodiment of the invention.

Presently recording in collaborative environment is done as a complete video stream. With reference to FIG. 6 one embodiment of the inventive system herein described provides for a recording system 1600 that records multimedia content in addition to identifying the collaborator, time and command that created the content whereby content is composed of one or more events, wherein an event as indicated above is a layer or a collection of layers. This permits any subsequent collaborator or user of the system and method as described in FIG. 1A through FIG. 5 to move or search across a collaborative session and select one identifier to view or to which to listen.

As previously indicated the state of the session 140 is maintained on the host 102 during a live session 140, then the database 104 at the end of a session. All client or user machines 130 to 134 that are logged into a session 140 are constantly updated with changes to the session 140 in real time. The content created from the session 140 is recorded in multimedia recorder 1603. Multimedia recorder 1603 and the playback recorder 1613 may be any one of a tape device, a solid state memory, a hard drive that records and plays back any type of memory (e.g., tape, solid state memory, and hard drive by way of example and not limitation) that stores any of several inputs, such as by way of description and not limitation, any data files, images, video or audio, collectively data files 1602a, text files 1602b, VoIP content 1602d, commands 1602c and time 1602e from hardware and software providing control functionality for plugins, whiteboards, VOIP and webcams. Recordings stored on recorder 1603 are subsequently stored in a database on server 1611.

The database DB 1619 on server 1611 provides input to a playback system 1613 through connection 1621. Playback system 1613 also receives control information from a filter system 1605, a search system 1607 and a skip/jump system 1609. The playback system 1613 provides input to an output device 1615 that by way of illustration and not limitation permits a user to one or more of the following: hear audio, or visualize video or digital graphical output.

The filter system 1605 permits a user to specify filter parameters upon which data stored in the multimedia recorder is played back in the playback system 1613. By way of example and not limitation the filter 1605 may receive templates 1604a that selectively allow portions of the content based upon user to be played back through playback system 1613 and subsequently outputted by output device 1615.

Other filter parameters based upon commands 1604b, or events 1604c layers may selectively allow portions of the content based upon user to be played back through playback system 1613 and subsequently outputted by output device 1615.

One embodiment of the invention allows users to set, control or restrict the viewing and editing of media layers in the same shared environment through different filtering algorithms based upon UET and commands. The invention further relates to a method of filtering one or more messages according to one of UET and commands. In one embodiment filtering allows users within the shared space to filter user inputs such as media-layers, user comments, notes, and drawings. In yet another embodiment filtering by a user would temporarily hide all other media-layer content except for the selected user or filtering a selected date range. In still another embodiment filtering by a user of any users media-layer, including its own contributions, would be highlighted against all other user media-layer content contributions. Highlighting by way of example and not limitation would include color, dotted lines, or various gray shadings as may be selected by a user.

The playback device 1613 receives input form several sources, such as filter device 1605, search device 1607 and skip/jump device 1609. These inputs communicate control data that serves providing playback based upon filter, search or skip/jump criteria. Additionally, the playback device 1613 receives input directly from the multimedia recorder 1603 and database server 1611. The playback device 1613 also receives input 1610a that provides playback for every action starting from the beginning of content to an end of a content. Typically, beginning of content to an end of a content delineates a period of one session between collaborators. Additionally, input 1610 provides the ability to playback selected users actions. And, finally input 1610c provides for playback between selected times and dates.

A user or collaborator may also search content based upon a UET or command as for example to determine a user's contribution. A collaborator may search content to cull out only certain events. As is therefore contemplated by the invention herein, a collaborator may employ any combination of UET and command as a search parameter to recall content. More particularly a search can designate a user 1606a, or a time period 1606b or a type of action 1606c, such as picking out text input, VOIP data, a tool employed in the creation of content. For example, tools that may be search may be graphical tools such as a rectangular tool and a circle tool. Other patterns may be employed based upon graphical or audio considerations. Additionally, a collaborator may search content only on the basis of time entered or by command.

A skip/jump device 1609 allows a user to auto or manually skip or jump over a portion of content. A control 1623 determines if the device 1609 will auto or manually skip a portion of content based upon text input 1608a, or particular uploaded content 1608b, a whiteboard input 1608c or VOIP parameters 1608d. VOIP parameters 1608d may include parameters or patterns that permit the skip/jump device 1609 to differentiate between speakers in a VOIP recorded conversation. The skip/jump device 1609 also permits jumping forward or backward dependent on a control input 1625. Control input 1625 may be effected by a toggle switch, by way of example.

The aspect of the invention herein is embodied in the recorder 1603 and playback 1613 devices permits the storing and accessing of the content composed of the media-layer events are described by at least a user, media-layer event designation, time and command; a means for inputting content associated with one or more of layers for composing multi type media into the shared space; and executable code for accessing said content based upon a user, media-layer events, time and command. More particularly, the invention herein is embodied in a computer system as in FIG. 1A for creating a collaborative file in a shared network including one or more user machines in a shared space, wherein the shared space is created by interaction of executable codes in a host and a user application and the shared space is described by a session attribute list; executable code for loading a media application with tools into one or more user machines; executable code for using a stage manager tool from the media application to stage and correlating media-layer events according to spatial, temporal and relational coordinate data in the user application, wherein the content composed of the media-layer events are described by at least one of a user, media-layer event designation, time and command; a recorder 1603 for storing content associated with one or more of layers for composing multi type media into the shared space; a playback device 1613 for accessing said content based upon one of a user, media-layer event designation, time and command; and an output device 1615 for selective audio visual presentation of said content based upon a user, media-layer events, time and command.

The filter device 1605 permits a user to specify filter parameters upon which one or more multi type media layers and the associated user, media-layer event designation, time and command are stored in the recorder, played back and output for audio or visual presentation. The search device 1607 permits a user to specify search parameters upon which one or more multi type media layers and the associated user, media-layer event designation, time and command are one of stored in the recorder, played back and output for audio or visual presentation. The skip/jump device 1609 permits a user to specify parameters upon which one or more multi type media layers and the associated user, media-layer event designation, time and command are one of stored in the recorder, played back and output for audio or visual presentation.

The playback system 1613 also provides access of its content to an editor 1617. The user may edit the content of the audio, video or digital graphical output using editor 1617. In one typical operation the user observes 1627 a display device illustrating a graphical image and edits the image which is then stored in database resident on database server 1611. The edited content is then stored in database server 1611. It can be retrieved via connection 1621 and presented as edited video via the playback device 1613 and displayed or heard on output device 1615. The aspect of the editing may require that the content is assembled or compiled from the edited content forward in time. To avoid having to reconstruct the content from its beginnings or its origins each time it is played back, a snapshot or key frame is recorded at specific intervals of time. If therefore a playback of content is required, the process 1500 does not require the reconstruction of the entire media-layered event based on a sequence of all commands from the time when the first session began. The content as stored in the DB 1619, recorder 1603 and playback 1613 devices is based on the snapshot or key frame as recorded at specific intervals of time.

Figure 7:
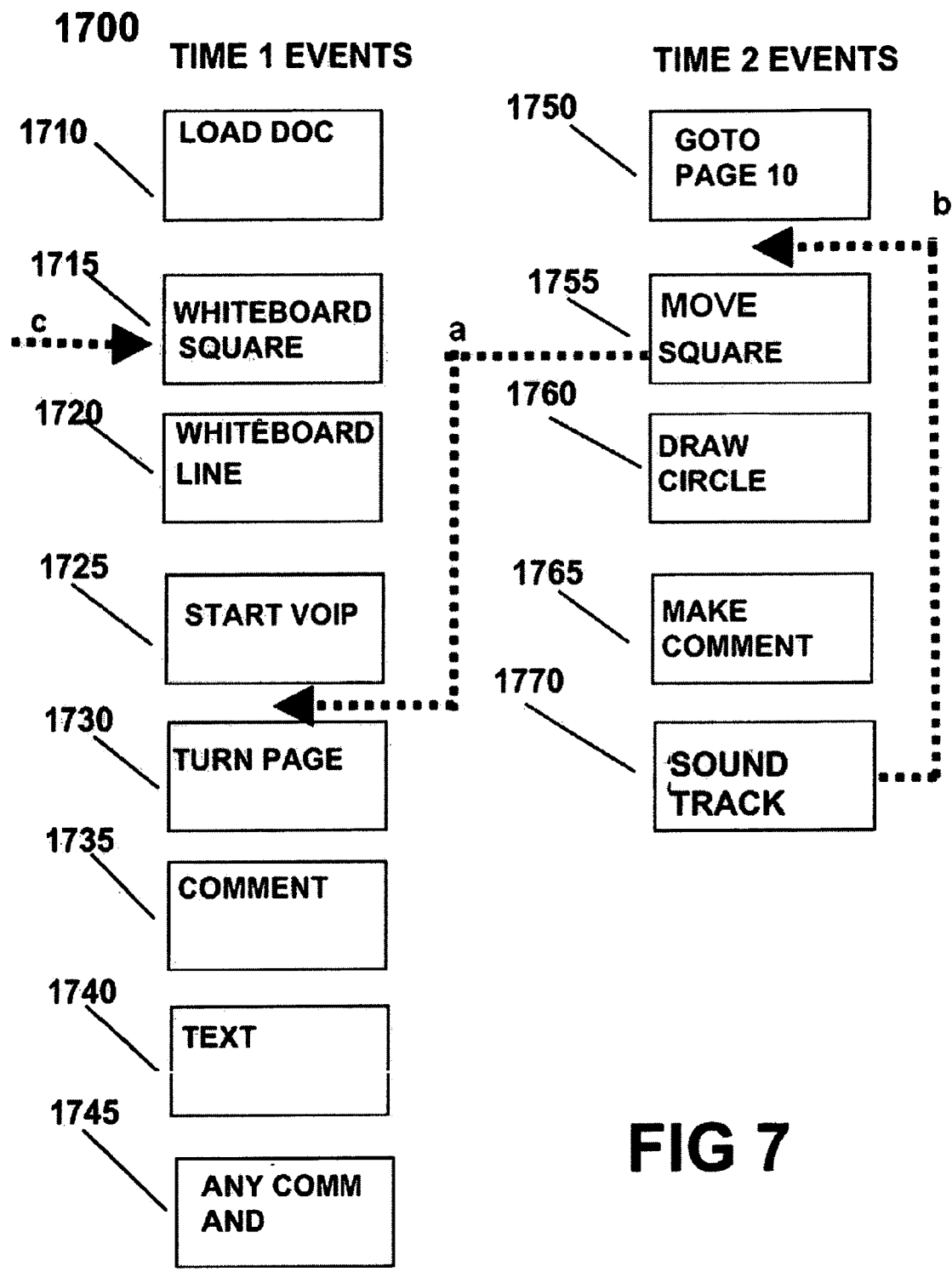
FIG. 7 depicts a block diagram illustrating a recording playback sequence in accordance with an embodiment of the invention.

In FIG. 7, a hypothetical list of commands is shown as having created two multi-layer events: one labeled Time 1 Events and the other labeled Time 2 Events. For purposes of illustration and not limitation, at the end of Time 1 Events the user may have ended the process 1500 (FIG. 5) inputting to the system (FIG. 6). On the other hand, after a period of time, for example ranging from minutes to years, the user may decide to add additional events, such as illustrated as Time 2 Events. When a user desires to continue adding multi-layer events it retrieves the content from the recorder 1603 (FIG. 6) as previously described and plays the multi-layer events through the playback 1613 (FIG. 6) on an appropriate output such as output 1615 (FIG. 6). A user may also decide to edit the content of either Time 1 Events or Time 2 Events. By way of example and not limitation, if the user desires to edit the content, it may splice content from the Time 2 Event into the Time 1 Event. By way of further example, it may splice the command move square 1755 shown by the dotted line a, at Time 3, between commands start VOIP 1725 and turn page 1730. In another example, it may insert a sound track 1779 shown by the dotted line b, at Time 4, further up in the list of commands of Time 2 Event. In yet another example it may delete Whiteboard Square 1715 shown by the dotted line c, at Time 5. At any time, including after an editing process the user can playback the Time 1 Events and/or Time 2 Events as subsequently edited. In the event that no steps were taken to avoid a collision or an anomaly such as an operation on content that came later in the sequence of an earlier deletion of the content, then playback may appear anomalous. In order to account for these anomalies and collisions and thereby reduce the effects caused by editing it may be necessary to reassemble the splicing, insertions and deletions that typically are made during an editing process, utilizing reassembly logic 1631 (FIG. 6). The reassembly logic insures that the ramifications of any splicing, insertions and deletions are considered and upon such consideration adjusts the newly edited version such that it is rationalized for subsequent playback. By way of example, if the whiteboard square 1715 were deleted, then the reassembly logic 1631 would automatically delete the following insertion of the move square command 1755. On the other hand if the user desired to store and subsequently play the edited version without reassembly, switch S1 provides that option as well. Those ordinary skilled in the art of engineering and programming understand the technical requirements for a device and a process for reassembling commands based upon the forgoing requirements to rationalize the multi media events following an editing process.

While the foregoing invention has been described with reference to the above embodiments, additional modifications and changes can be made without departing from the spirit of the invention. Accordingly, such modifications and changes are considered to be within the scope of the appended claims.

We claim:

1. A computer software method for creating a collaborative file in a shared network space comprising the steps of:
   accessing one or more user machines in a shared space, wherein the shared space is created by interaction of executable codes in a host and a user application and the shared space is described by a session attribute list;
   loading a media application with tools into one or more user machines;
   using a stage manager tool from the media application to stage and correlating one or more media-layer events according to spatial, temporal and relational coordinate data in the user application, wherein the media-layer events are described by at least a user, a media-layer event designation, a time and command;
   recording one or more of media-layer events and the associated user, media-layer event designation, time and command; and
   accessing said one or more of media-layer events based upon one or more of the associated user, media-layer event designation, time and command; and
   playing back the recording utilizes utilizing the user, media-layer event designation, time and command as parameters in association with one or more of a filter device, a search device or a skip/jump device.

2. The method of claim 1, further comprising storing in any medium one of data, images, video or audio files.

3. The method of claim 1, further comprising outputting the one or more of media-layer events to one or more play back systems, graphical displays, video displays and audio devices.

4. The method of claim 3 further comprising editing the content of the one or more of media-layer events.

5. The method of claim 3 further comprising a user specifying the user, media-layer event designation, time and command as parameters for the filter system to output multilayer events to one or more play back systems, graphical displays, video displays and audio devices.

6. The method of claim 3 further comprising a user specifying the user, media-layer event designation, time and command as parameters for the search system to output multilayer events to one or more play back systems, graphical displays, video displays and audio devices.

7. The method of claim 3 further comprising a user specifying the user, media-layer event designation, time and command as parameters for the skip/jump system to output multilayer events to one or more play back systems, graphical displays, video displays and audio devices.

8. The method of claim 3 further comprising filtering one or more messages according to one of user, media-layer event designation, time and command allows users to one of conceal or highlight an output of media-layer content for one of the selected user, media-layer event designation, time and command.

9. The method of claim 3 wherein filtering users set, control or restrict the outputting and editing of media layers filtering algorithms based upon one of user, media-layer event designation, time and command.

10. A computer system for creating a collaborative file in a shared network comprising:
    one or more user machines in a shared space, wherein the shared space is created by interaction of executable codes in a host and a user application and the shared space is described by a session attribute list;
    executable code for loading a media application with tools into one or more user machines;
    executable code for using a stage manager tool from the media application to stage and correlating one or more media-layer events according to spatial, temporal and relational coordinate data in the user application, wherein the one or more media-layer events are described by at least a user, media-layer event designation, time and command;
    a recorder for storing one or more multi type media layers and the associated user, media-layer event designation, time and command;
    a playback device having inputs from at least one or more of a filter device, a search device, a skip/jump device, a recorder or a database server, for accessing said media-layer event based upon a user, media-layer event designation, time and command; and
    an output device for selective viewing of said media-layer event based upon a user, media-layer event designation, time and command.

11. The system of claim 10 wherein the playback device provides media-layer event playback for every action starting from the beginning of a media-layer event content to an end of a media-layer event content.

12. The system of claim 10 wherein the recorder and the playback device may be any one of an apparatus that comprises a tape device, a solid state memory, or a hard drive that records and plays back any data files, images, video, audio, text files and commands from hardware and software providing control functionality for one of plugins, whiteboards, VoIP or webcams.

13. The system of claim 10 wherein the playback device provides input to an output device for audio or visual presentation.

14. The system of claim 10 wherein the filter device permits a user to specify filter parameters upon which one or more multi type media layers and the associated user, media-layer event designation, time and command are one of stored in the recorder, played back and output for audio or visual presentation.

15. The system of claim 10 wherein the search device permits a user to specify search parameters upon which one or more multi type media layers and the associated user, media-layer event designation, time and command are one of stored in the recorder, played back and output for audio or visual presentation.

16. The system of claim 10 wherein the skip/jump device permits a user to specify parameters upon which one or more multi type media layers and the associated user, media-layer event designation, time and command are one of stored in the recorder, played back and output for audio or visual presentation.

17. The system of claim 10 wherein the skip/jump device allows a user to one of auto or manually skip or jump over a portion of a media-layer event.

18. The system of claim 10 wherein device for reassembly of the edited media-layer event allows a user playback a rationalized version of the media-layer event.

19. A non-transitory computer readable medium having computer-executable instructions for creating a collaborative file in a shared network space comprising the steps of:
   accessing one or more user machines in a shared space, wherein the shared space is created by interaction of executable codes in a host and a user application and the shared space is described by a session attribute list;
   loading a media application with tools into one or more user machines; using a stage manager tool from the media application to stage and correlating one or more media-layer events according to spatial, temporal and relational coordinate data in the user application, wherein the media-layer events are described by at least a user, a media-layer event designation, a time and command;
   recording one or more of media-layer events and the associated user, media-layer event designation, time and command; and
   accessing said one or more of media-layer events based upon one or more of the associated user, media-layer event designation, time and command; and
   playing back the recording utilizes utilizing the user, media-layer event designation, time and command as parameters in association with one of a filter device, a search device or a skip/jump device.

* * * * *